United States Patent
Hamagishi

(10) Patent No.: US 9,521,403 B2
(45) Date of Patent: Dec. 13, 2016

(54) DISPLAY DEVICE AND ELECTRONIC APPARATUS

(75) Inventor: Goro Hamagishi, Osaka (JP)

(73) Assignee: Japan Display Inc., Tokyo (JP)

( * ) Notice: Subject to any disclaimer, the term of this patent is extended or adjusted under 35 U.S.C. 154(b) by 384 days.

(21) Appl. No.: 13/043,744

(22) Filed: Mar. 9, 2011

(65) Prior Publication Data
US 2011/0228183 A1 Sep. 22, 2011

(30) Foreign Application Priority Data
Mar. 16, 2010 (JP) .................................. 2010-058799

(51) Int. Cl.
G03B 35/24 (2006.01)
H04N 13/04 (2006.01)
G02B 27/22 (2006.01)
G09G 3/00 (2006.01)
G09G 3/36 (2006.01)
G02F 1/1335 (2006.01)

(52) U.S. Cl.
CPC ...... *H04N 13/0413* (2013.01); *G02B 27/2214* (2013.01); *G03B 35/24* (2013.01); *G09G 3/003* (2013.01); *G09G 3/3611* (2013.01); *H04N 13/0477* (2013.01); *G02F 1/133512* (2013.01); *G09G 2300/023* (2013.01); *G09G 2354/00* (2013.01)

(58) Field of Classification Search
CPC .................................................. G02B 27/2214
See application file for complete search history.

(56) References Cited

U.S. PATENT DOCUMENTS

| | | | | |
|---|---|---|---|---|
| 5,855,425 A | * | 1/1999 | Hamagishi | 353/7 |
| 5,872,590 A | * | 2/1999 | Aritake et al. | 348/57 |
| 6,049,424 A | * | 4/2000 | Hamagishi | 359/464 |
| 6,710,920 B1 | * | 3/2004 | Mashitani et al. | 359/463 |
| 6,970,290 B1 | * | 11/2005 | Mashitani et al. | 359/462 |
| 7,190,518 B1 | * | 3/2007 | Kleinberger et al. | 359/465 |

(Continued)

FOREIGN PATENT DOCUMENTS

| | | |
|---|---|---|
| JP | 9-197344 | 7/1997 |
| JP | 2001-056212 | 2/2001 |

(Continued)

OTHER PUBLICATIONS

Japanese Office Action issued Jul. 2, 2013 in corresponding Japanese Patent Application No. 2010-058799.

*Primary Examiner* — Lauren Nguyen
*Assistant Examiner* — Anthony G Quash
(74) *Attorney, Agent, or Firm* — K&L Gates LLP

(57) ABSTRACT

A display device includes: an image display means for displaying left-eye images and right-eye images alternately; a light-shielding means for generating an effect of binocular parallax in images displayed by the image display means; and a detection means for detecting a position of an observer, wherein the light-shielding means includes an image transmitting portion through which images of the image display means are transmitted and an image non-transmitting portion through which images are not transmitted, which moves a position of the image transmitting portion by ½, ¼ or ⅛ of a light-shielding portion pitch prescribed by an arrangement interval of the image transmitting portion based on a detected result of the detection means.

8 Claims, 11 Drawing Sheets

(56) References Cited

U.S. PATENT DOCUMENTS

| | | | |
|---|---|---|---|
| 2006/0146046 A1* | 7/2006 | Longhurst et al. | 345/418 |
| 2008/0259233 A1* | 10/2008 | Krijn et al. | 349/15 |
| 2010/0177170 A1* | 7/2010 | Kusuno | 348/51 |
| 2011/0006979 A1 | 1/2011 | Min et al. | |
| 2011/0157697 A1* | 6/2011 | Bennett et al. | 359/462 |

FOREIGN PATENT DOCUMENTS

| | | | |
|---|---|---|---|
| JP | 2001-101583 | 4/2001 | |
| JP | 2002-305759 | * 10/2002 | H04N 13/00 |
| JP | 2010-008719 | 1/2010 | |
| JP | 2011-018049 | 1/2011 | |

\* cited by examiner

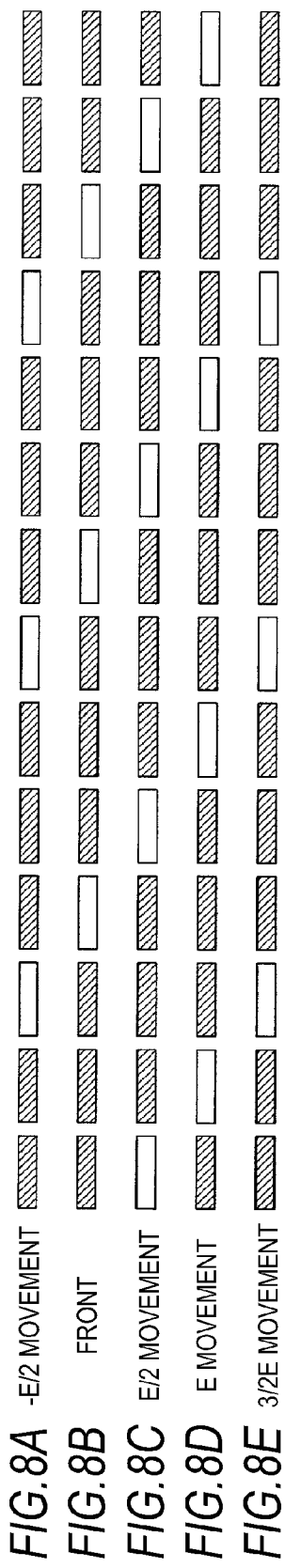

FIG.9

| VIEWING STATE | MOVEMENT OF OBSERVER | MOVEMENT OF S1 |
|---|---|---|
| RIGHT-CROSSTALK | E/2 | Q/4 |
| REVERSE VISION | E | Q/2 |
| LEFT-CROSSTALK | -E/2(3/2E) | -Q/4(3/4Q) |

| VIEWING STATE | MOVEMENT DISTANCE OF OBSERVER | MOVEMENT DISTANCE OF IMAGE TRANSMITTING PORTION S1 |
|---|---|---|
| RIGHT-CROSSTALK | E/4 | Q/8 |
| | E/2 | Q/4 |
| | 3E/4 | 3Q/8 |
| REVERSE VISION | E | Q/2 |
| LEFT-CROSSTALK | 5E/4(-3E/4) | -3Q/8(5Q/8) |
| | 3E/2(-E/2) | -Q/4(3Q/4) |
| | 7E/4(-E/4) | -Q/8(7Q/8) |

FIG.13
IMAGE SEEN BY RIGHT EYE
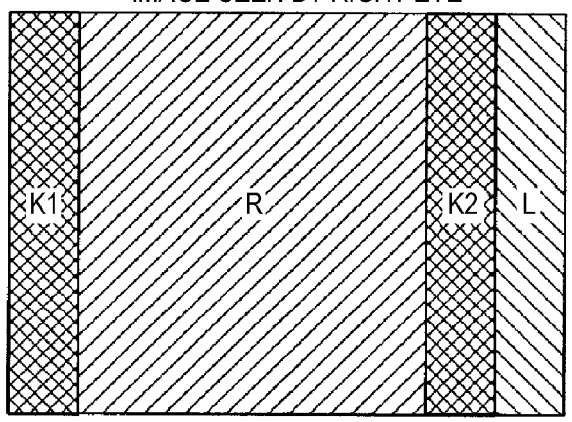
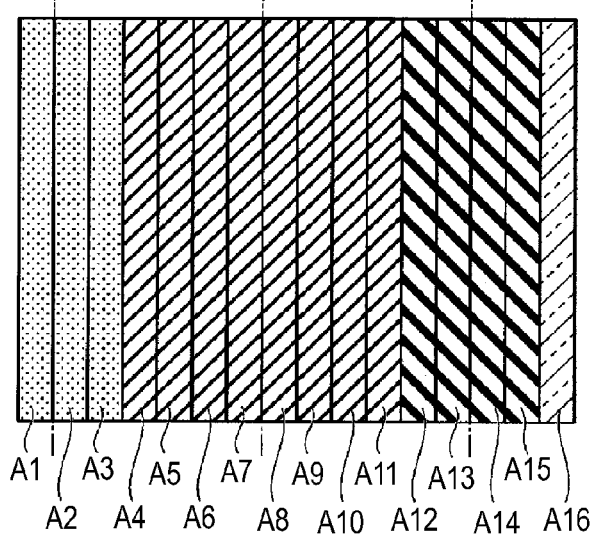
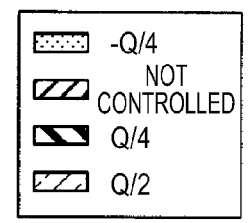
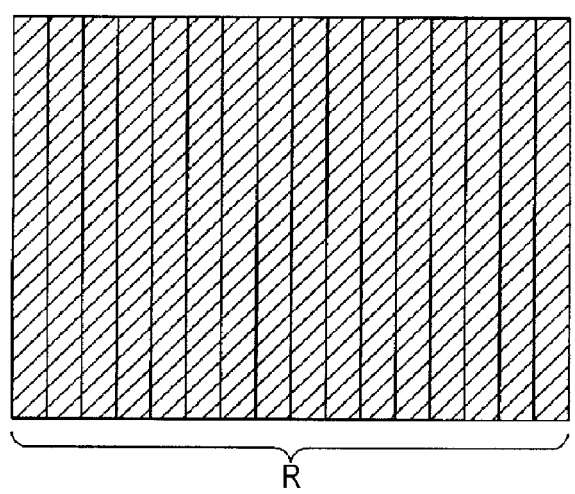

DISPLAY DEVICE AND ELECTRONIC APPARATUS

CROSS REFERENCES TO RELATED APPLICATIONS

The present application claim priority to Japanese Priority Patent Application JP 2010-058799 filed in the Japan Patent Office on Mar. 16, 2010, the entire contents of which is hereby incorporated by reference.

BACKGROUND

The present application relates to a display device and an electronic apparatus.

Examples of devices displaying 3D video without using special glasses in related art include one so adapted that a parallax barrier or a lenticular lens is disposed on an observer's side of a display screen of a display panel such as a liquid crystal panel, so that 3D video can be viewed by separating light from right-eye images and left-eye images alternately displayed for each vertical line on the display screen.

In the above 3D video display device, the optimum observation position is set. Therefore, when the observer moves, it is difficult to view the 3D video at the position. Accordingly, a technique in which 3D video can be viewed at the position of the movement destination by moving a light-shielding barrier so as to correspond to a movement direction of the observer is known (for example, refer to JP-A-9-197344 (Patent Document 1) and JP-A-2001-166259 (Patent Document 2)).

SUMMARY

However, in the techniques relating to the above Patent Documents, there is a problem that processing will be extremely complicated because movement of the barrier is controlled as well as switching of input of the right-eye images and left-eye images into pixels is performed.

In view of the above, it is desirable to provide a display device and an electronic apparatus capable of displaying 3D video in a good manner only by controlling the barrier even when the observer moves.

According to an embodiment, there is provided a display device including an image display means for displaying left-eye images and right-eye images alternately, a light-shielding means for generating an effect of binocular parallax in images displayed by the image display means and a detection means for detecting a position of an observer, in which the light-shielding means includes an image transmitting portion through which images of the image display means are transmitted and an image non-transmitting portion through which images are not transmitted, which moves a position of the image transmitting portion by ½, ¼ or ⅛ of a light-shielding portion pitch prescribed by an arrangement interval of the image transmitting portion based on a detected result of the detection means.

In the display device according to the embodiment, when the position of a head of the observer moves in the horizontal direction by the half of the distance between eyes, it is possible to prevent a crosstalk image from being incident on an eye by moving the position of the image transmitting portion by ¼ of the pitch. It is also possible to allow the observer to view normal 3D images by switching between images incident on the right eye and incident on the left eye by moving the position of the image transmitting portion by ½ of the pitch when the head position of the observer moves in the horizontal direction by the distance between eyes. It is further possible to switch the crosstalk image or the reverse vision image incident on respective eyes to the normal image by moving the position of the image transmitting portion by ½, ¼ or ⅛ of the pitch when the head position of the observer shifted forward or backward from the suitable viewing range. Therefore, the highly reliable display device can be obtained only by moving the image transmitting portion when the observer moves.

It is preferable that the light-shielding means is formed by a liquid crystal panel in the above display device.

According to the configuration, it is possible to move positions of the image transmitting portion and the image non-transmitting portion by a given distance simply and positively by opening and closing liquid crystal shutters formed by respective pixels of the liquid crystal panel.

It is preferable that one pitch of the light-shielding portion pitch includes four pixels in the liquid crystal panel and one of the four pixels forms the image transmitting portion in the display device.

According to the configuration, the configuration of moving the image transmitting portion by ¼ or ½ of the pitch can be realized easily.

It is preferable that one pitch of the light-shielding portion pitch includes eighth pixels in the liquid crystal panel and adjacent two or three of the eighth pixels form the image transmitting portions in the display device.

According to the configuration, the configuration of moving the image transmitting portion by ⅛ of the pitch can be realized easily and the configuration can respond to smaller movements of the observer. When the position of the head of the observer moves in the horizontal direction by ¼ of the distance between eyes, it is possible to prevent the crosstalk region from being incident on the eye by moving the position of the image transmitting portion by ⅛ of the light-shielding portion pitch. Therefore, the high performance display device which can respond to slight movements of the observer can be obtained.

It is further preferable that the light-shielding means is configured to switch the number of pixels forming the image transmitting portions.

According to the configuration, it is possible to display 3D images in which any of moire or crosstalk is preferentially eliminated can be displayed by switching the number of pixels functioning as the image transmitting portions.

According to another embodiment, there is provided an electronic apparatus including the above display device.

In the electronic apparatus according to the embodiment, the electronic apparatus itself will be the highly reliable apparatus which can display good 3D images because the apparatus includes the above display device.

Additional features and advantages are described herein, and will be apparent from the following Detailed Description and the figures.

BRIEF DESCRIPTION OF THE FIGURES

FIGS. 8A to 8E are schematic views showing the positional relationship between the movement distance of the observer and the image transmitting portions;

FIG. 9 is a chart showing the relationship among the movement direction of the observer, the image viewing state and the movement direction of the barrier;

FIG. 13 is a view showing correspondence between the image seen by the right eye and the light-shielding regions of the light-shielding barrier when the observer positioned backward from the suitable viewing distance.

DETAILED DESCRIPTION

Embodiments of the present application will be described below in detail with reference to the drawings.

Figure 1:
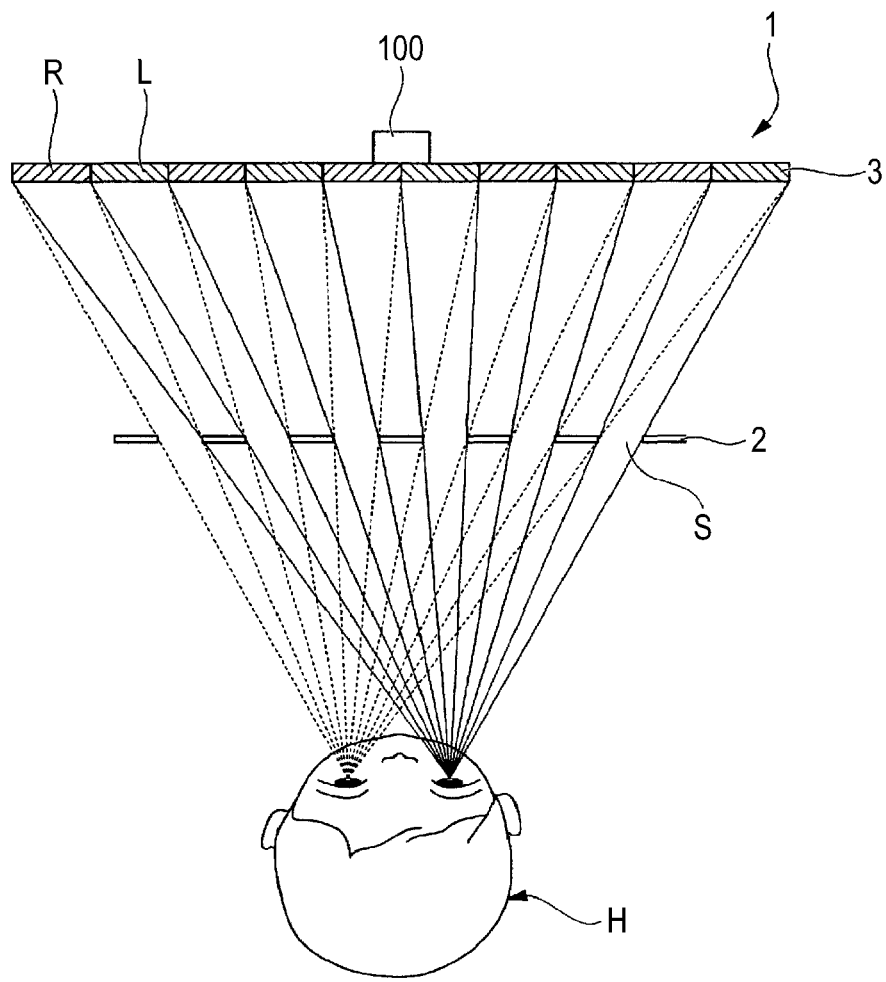
FIG. 1 is a view showing an outline configuration of a 3D video display device (display device) using a parallax barrier.

FIG. 1 is a view showing an outline configuration of a 3D video display device (display device) using a parallax barrier as an example of the display device according to the embodiment.

As shown in FIG. 1, a 3D image display device 1 includes a liquid crystal panel (image display means) 3 and a light-shielding barrier (light-shielding means) 2. The liquid crystal panel 3 is provided with a sensor (detection means) 100 detecting a position of a head of an observer H. On the liquid crystal panel 3, left-eye images L and right-eye images R are alternately displayed in every other line. The light-shielding barrier 2 is arranged between the liquid crystal panel 3 and the observer H as an image separate means separating the left-eye images L and the right-eye images R spatially.

The light-shielding barrier 2 includes plural image transmitting portions corresponding to the right-eye images R and the left-eye images L, which are for preventing the left-eye images L from being incident on a right eye of the observer H as well as for preventing the right-eye images R from being incident on a left eye of the observer H.

The light-shielding barrier 2 according to the embodiment is formed by a liquid crystal panel including plural vertical-striped pixels S. The light-shielding barrier 2 includes image non-transmitting portions through which images of the liquid crystal panel 3 are not transmitted and image transmitting portions through which images are transmitted. Spe-cifically, the light-shielding barrier 2 allows respective pixels S to function as the image transmitting portions or the image non-transmitting portions by applying different voltages on liquid crystal layers corresponding to respective pixels S as described later.

Figure 2:
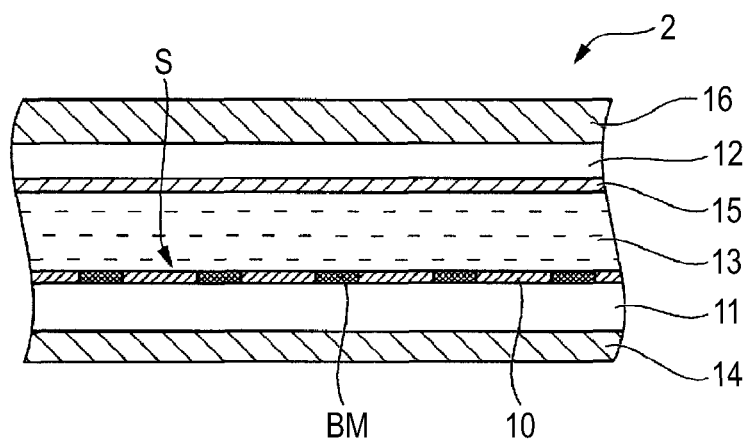
FIG. 2 is a view showing an outline configuration of the light-shielding barrier formed by the liquid crystal panel.

FIG. 2 is a view showing an outline configuration of the light-shielding barrier 2 formed by the liquid crystal panel.

As shown in FIG. 2, the liquid crystal panel includes a liquid crystal layer 13 between two glass substrates 11, 12. Polarizing plates 14, 16 are provided at outer surfaces of the two glass substrates 11, 12. The polarizing plate 14 on the liquid crystal panel 3 side which displays images in these two polarizing plates 14, 16 can be also used as a polarizing plate (not shown) of the liquid crystal panel 3. The polarizing plate 14 and the polarizing plate 16 are bonded together so that polarization axes thereof are parallel with each other. At inner surface side of one glass substrate 12, a transparent electrode 15 is formed over the whole surface. The transparent electrode 15 is made of, for example, ITO.

On the other substrate 11, pixel electrodes 10 corresponding to respective pixels S are provided. A black matrix BM is arranged between adjacent pixel electrodes 10, which functions as a constant light-shielding portion. When voltage is applied to the pixel electrodes 10, a polarization axis of light selected by the polarizing plate 14 is rotated by 90 degrees in accordance with rotation of liquid crystal in the liquid crystal layer 13 and light is transmitted through the polarizing plate 16 to exit. On the other hand, when voltage is not applied to the pixel electrodes 10, the polarization axis of light selected by the polarizing plate 14 are not rotated in the liquid crystal layer 13, therefore, light does not transmit through the polarizing plate 16.

Figure 3A:
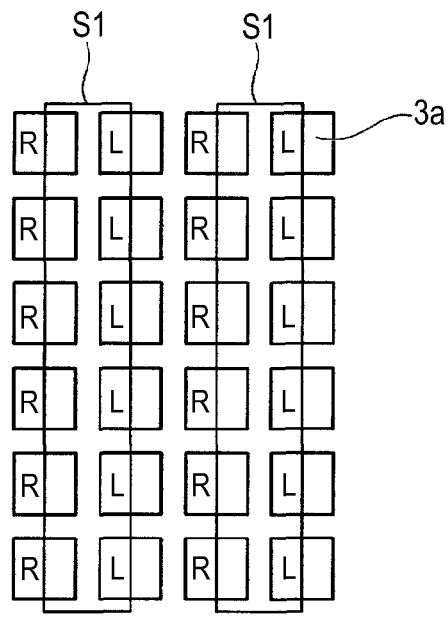
FIG. 3A is a view showing the arrangement relationship between pixels in the liquid crystal panel and the light-shielding barrier.

In the light-shielding barrier 2, when a given voltage is selectively applied to the pixel electrodes 10, given pixels S function as image transmitting portions S1 or image non-transmitting portions S2. FIG. 3A is a plan view showing the arrangement relationship between pixels 3a displaying the right-eye images R and the left-eye images L in the liquid crystal panel 3 and the light-shielding barrier 2, and FIG. 3B is an enlarged view of a relevant part showing an arrangement structure of the image transmitting portions S1 and the image non-transmitting portions S2.

As shown in FIG. 3A, the light-shielding barrier 2 is driven so that one image transmitting portion S1 corresponds to two pixels 3a displaying the right-eye image R and the left-eye image L of the liquid crystal panel, allowing the left-eye image L to be incident on the left eye of the observer H and allowing the right-eye image R to be incident on the right eye of the observer H by separating the image transmitting through the liquid crystal panel into right and left. In the embodiment, the pixels S including the image transmitting portion S1 have a stripe shape and are set to the size which can separates the right-eye image R and the left-eye image L in a good manner.

Figure 3B:
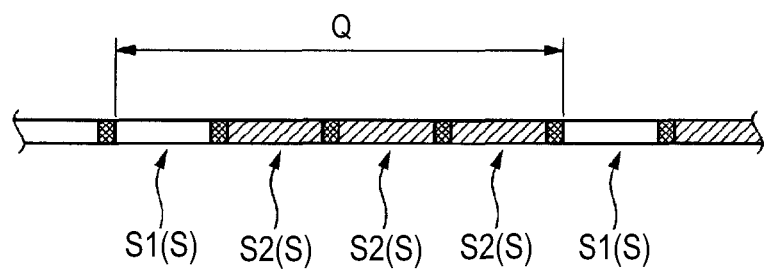
FIG. 3B is an enlarged view of a relevant part showing the arrangement relationship of the image transmitting portions and the image non-transmitting portions.

As shown in FIG. 3B, an interval between pixels S which are function as the image transmitting portions S1 of the light-shielding barrier 2 is prescribed as a light-shielding portion pitch Q. The light-shielding barrier 2 includes four pixels S in one light-shielding portion pitch Q, and one of the pixels S forms the image transmitting portion S1 through which images are transmitted. The other three pixels S in one shielding portion pitch Q are configured to function as image non-transmitting portions S2.

Figure 4:
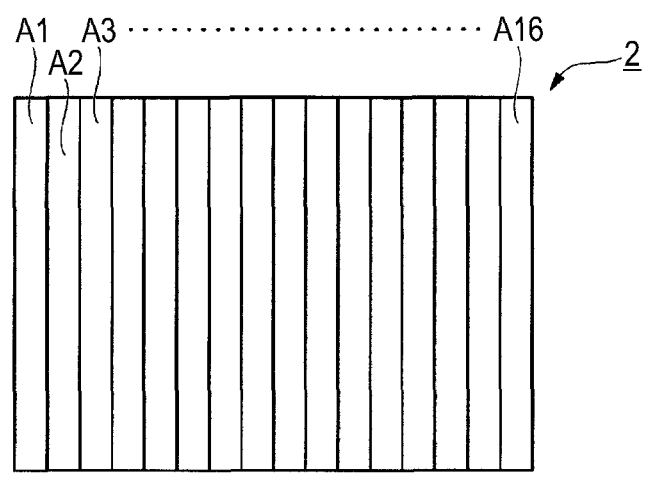
FIG. 4 is a view for explaining light-shielding regions of the light-shielding barrier.

The light-shielding barrier 2 selectively applies a given voltage to the pixel electrodes 10 to thereby allow positions of the image transmitting portions S1 to be changed. The 3D image display device 1 according to the embodiment can adjust the positions of the image transmitting portions S1 of the light-shielding barrier 2 with respect to each region. Specifically, the light-shielding barrier 2 can set a movement amount of the image transmitting portion S1 in each set of sixteen regions in plan view as shown in FIG. 4. Hereinafter, the sixteen regions are referred to as light-shielding regions A1 to A16.

The light-shielding barrier 2 allows only the right-eye image R to be incident on the right eye of the observer H as well as allows only the left-eye image L to be incident on the left eye of the observer H to thereby generate an effect of binocular parallax and to allow the observer H to view 3D images.

Figure 5:
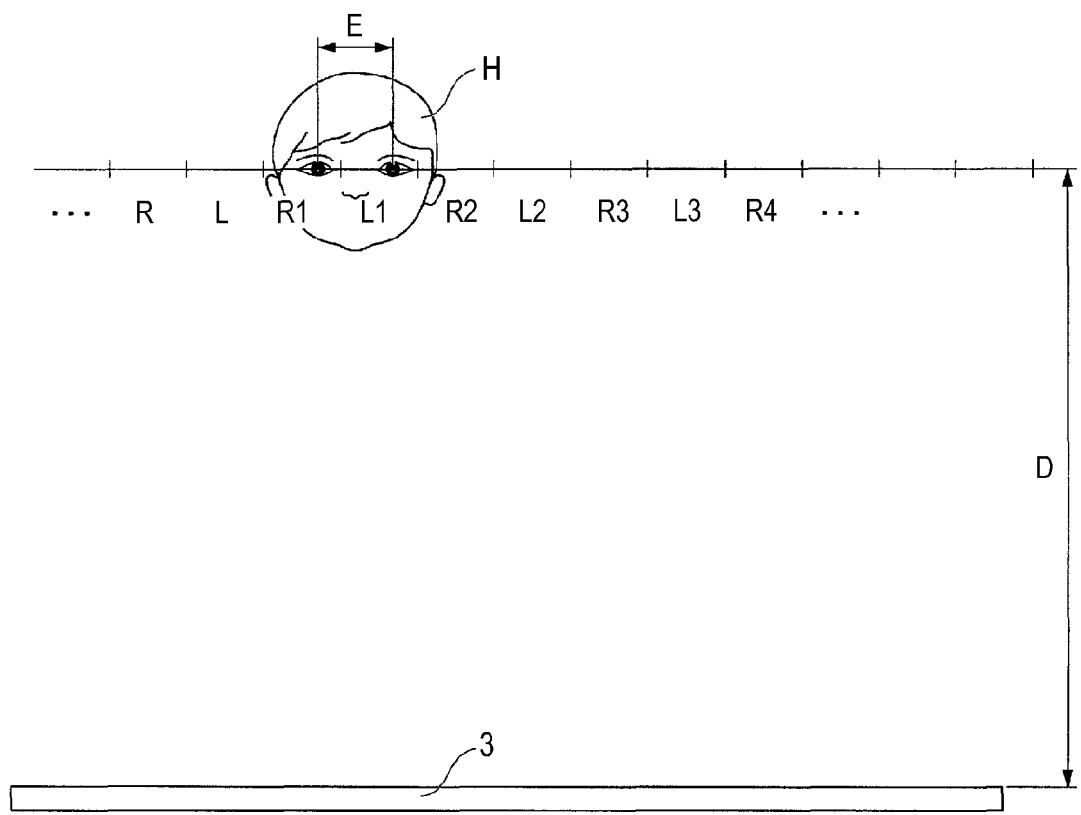
FIG. 5 is a view showing image observable regions in a state in which an observer is positioned at a suitable viewing distance.

The 3D image display device 1 is designed so that the right-eye images R and the left-eye images L are alternately observed at a pitch of a distance between eyes E in a state that the observer H is at the optimum observation position (suitable viewing distance D) as shown in FIG. 5. In FIG. 5, " . . . , R, R1, R2, R3, R4, . . . ," are right-eye image observable regions and " . . . , L, L1, L2, L3, . . . " are left-eye image observable regions.

Figure 6:
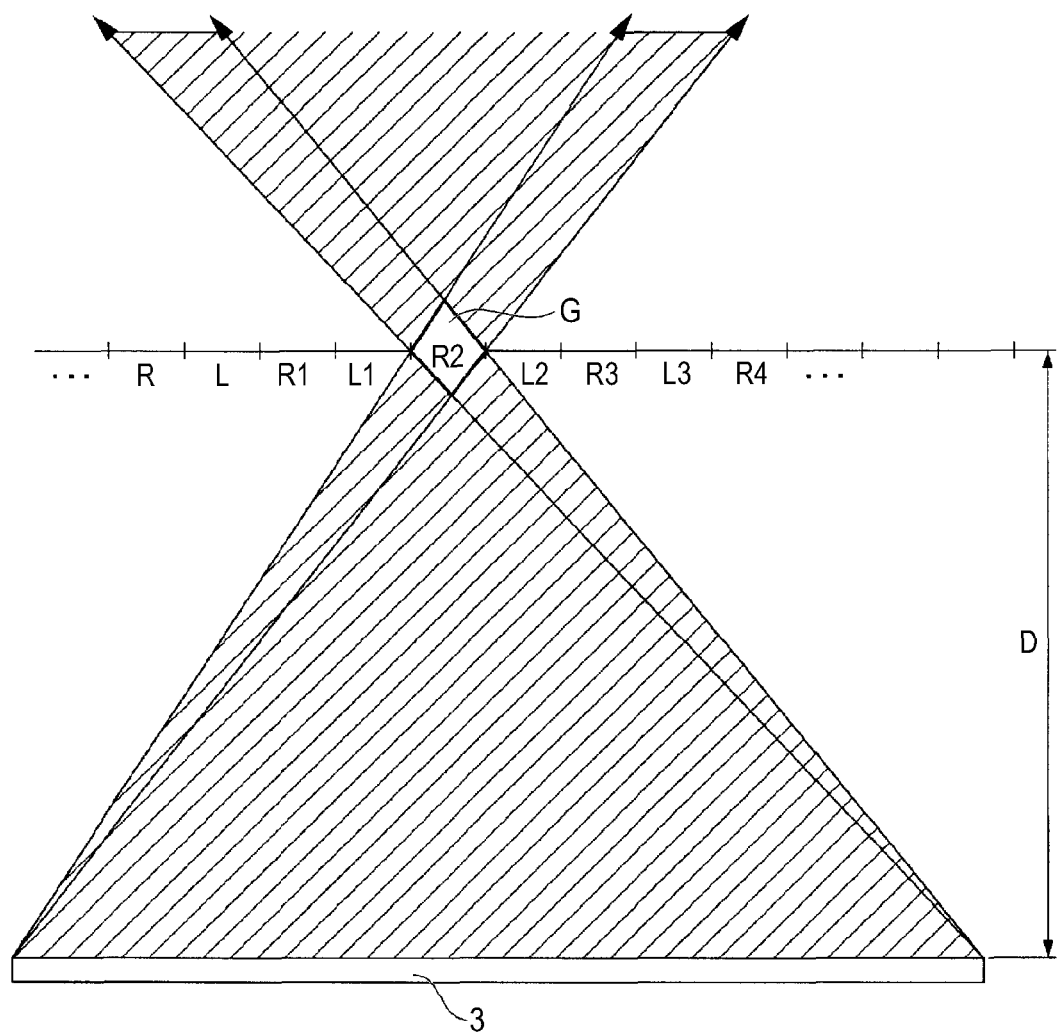
FIG. 6 is a view showing regions where the right-eye image is observed.

Images of a corresponding eye are condensed to image observation regions of each eye from the whole surface of the screen of the liquid crystal panel 3. For example, when paying attention to an R2 region at the full front of the screen, there actually exists an observable range also at a position shifted forward and backward to some degree as shown in FIG. 6. That is, the right-eye images R from the whole surface of the screen can reach a square region G, therefore, the right-eye images R can be observed at an upper end or a lower end of the square region G. Light transmitting through the R2 region does not reach regions other than shaded regions in the drawing.

Here, when positioning at the suitable viewing position, only the right-eye images R of the liquid crystal panel 3 are incident on the right eye after transmitting through the center of each image transmitting portion S1 of the light-shielding barrier 2, and the left-eye images L are shielded by the image non-transmitting portion S2. On the other hand, only the left-eye images L of the liquid crystal panel are incident on the left eye after transmitting through the center of each image transmitting portion S1 of the light-shielding barrier 2 and the right-eye images R are shielded by the image non-transmitting portions S2.

As shown in FIG. 5, when the observer H (position between eyebrows) moves by the distance between eyes E, a reverse vision state occurs, in which the left-eye image L2 is incident on the right eye of the observer H and the right-eye image R3 is incident on the left eye. When the observer H (position between eyebrows) moves by the half of the distance between eyes E, a crosstalk state occurs, in which video in which the right-eye image R2 and the left-eye image L2 are mixed is incident on the right eye of the observer H and video in which the right-eye image R3 and the left-eye image L2 are mixed is incident on the left eye.

In the above reverse vision state or the crosstalk state, it is difficult that the observer H observes good 3D images. In response to this, the 3D image display device 1 according to the embodiment is configured to move the position of the image transmitting portion S1 in the light-shielding barrier 2 when a sensor 100 detects that the head of the observer H has moved in the horizontal direction by a given amount.

In order to eliminate the crosstalk, the position of the image transmitting portion S1 is moved so that the right-eye image R and the left-eye image L transmit through the center of the image transmitting portion S1. Here, the relationship between the movement amount of the observer H and the movement amount of the image transmitting portion S1 will be explained with reference to FIGS. 7A, 7B.

Figure 7A:
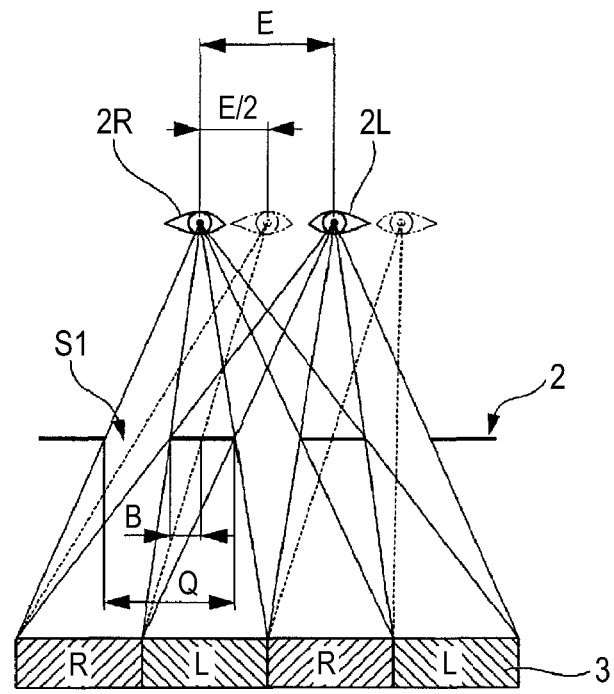
FIGS. 7A, 7B are views showing the relationship between the movement amount of the observer and the movement amount of the image transmitting portion.

In FIG. 7A, assume that the movement amount of the image transmitting portion S1 through which the right-eye image R and the left-eye image L can be transmitted at the center thereof is "B" and the light-shielding portion pitch is "Q" and the movement distance of the observer is E/2. In this case, the following expressions (1) AND (2) can be derived from FIG. 7A.

$$B:E/2=Q/2:E \quad (1)$$

$$B=Q/4 \quad (2)$$

That is, the 3D image display device 1 according to the embodiment prevents a crosstalk region from being viewed by the observer H by moving the image transmitting portion S1 along the moving direction of the observer H by ¼ of the light-shielding portion pitch Q when the head of the observer H moves by the half of the distance between eyes E (E/2).

Figure 7B:
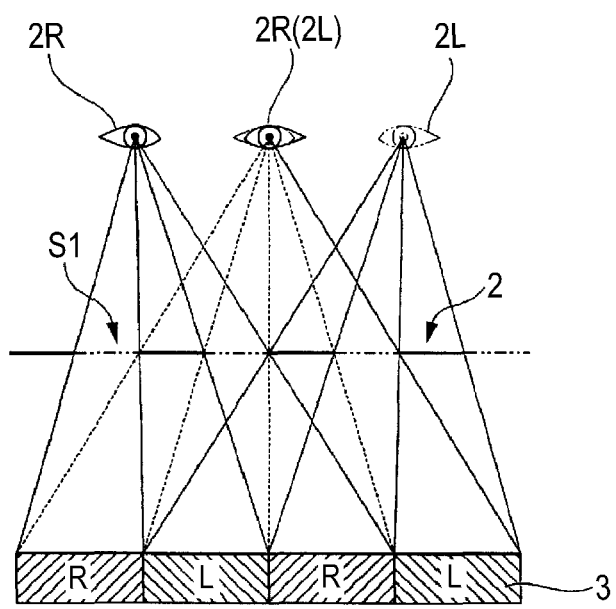

When the head of the observer H is moved by the distance between eyes "E", the position of the liquid crystal panel 3 with respect to the right eye is shifted as shown in FIG. 7B, as a result, the reverse vision state occurs, in which the left-eye image L is incident on the right eye and the right-eye image R is incident on the left eye. In order to cancel the reverse vision state, the image transmitting portion S1 is moved so that the right-eye image R and the left-eye image L transmit through the center of the image transmitting portion S1. That is, as shown by a chain double-dashed line of FIG. 7B, the image transmitting portion S1 is moved by the half of the light-shielding portion pitch Q to thereby allow the right-eye image R to be incident on the right eye as well as allow the left-eye image L to be incident on the left eye.

That is, the 3D image display device 1 according to the embodiment moves the image transmitting portion S1 by ½ of the light-shielding portion pitch Q along the movement direction of the observer H when the head of the observer H moves by the distance between eye E, thereby switching the image incident on the right eye of the observer with the image incident on the left eye to cancel the reverse vision state.

Hereinafter, a state occurring when the head of the observer H moves toward the left direction seen from the liquid crystal panel 3 side by the half of the distance between eyes (E/2) will be referred to as a left-crosstalk state. A state occurring when the head of the observer H moves toward the right direction seen from the liquid crystal panel 3 side by the half of the distance between eyes (E/2) will be referred to as a right-crosstalk state. Additionally, a state occurring when the head of the observer H moves by the distance between eyes E seen from the liquid crystal panel 3 side will be referred to as the reverse vision state.

In the method of viewing 3D images by using the light-shielding barrier as in the embodiment, the right-crosstalk state is changed into the reverse vision state, then, changed into the left-crosstalk state again as the head of the observer H moves in the right direction seen from the liquid crystal panel 3 side according to the structure. That is, when the head of the observer H moves in the right direction by the distance of 3E/2 seen from the liquid crystal panel 3 side, the left-crosstalk state occurs in the same manner as in the case in which the head of the observer H moves in the left direction by E/2 seen from the liquid crystal panel 3 side. In the embodiment, the position of the image transmitting portion S1 can be adjusted so that the left and right crosstalk states or the reverse vision state occurring in accordance with the movement direction and the movement distance of the head of the observer H are cancelled by utilizing the above characteristics.

FIGS. 8A to 8E are schematic views showing the positional relationship among the movement direction and distance of the observer H and the image transmitting portions S1 of the light-shielding barrier 2. FIG. 8A corresponds to the left-crosstalk state in which the head of the observer H moves in the left direction (referred to as a minus direction for convenience of explanation) seen from the liquid crystal panel 3 side by the half of the distance between eyes E (E/2), FIG. 8B corresponds to a state in which the head of the observer H is positioned just in front of the liquid crystal panel 3, FIG. 8C corresponds to the right-crosstalk state in which the head of the observer H moves in the right direction (referred to as a plus direction for convenience of explanation) seen from the liquid crystal panel 3 side by the half of the distance between eyes E (E/2), FIG. 8D corresponds to the reverse vision state in which the head of the observer H moves in the right direction seen from the liquid crystal panel 3 side by the distance between eyes E and FIG. 8E corresponds to a case in which the head of the observer H moves in the right direction seen from the liquid crystal panel 3 side by 3E/2.

As shown in FIG. 8E, when the head of the observer H moves in the right direction by 3E/2, the position of the image transmitting portion S1 may be moved in the right direction from a standard position by ¾ of the light-shielding portion pitch Q. As the left-crosstalk state occurs when the head of the observer H moves in the right direction by 3E/2 as described above, the image transmitting portion S1 can be moved to the same position by moving the image transmitting portion S1 in the left direction from the standard state by ¼ of the light-shielding portion pitch Q (refer to FIGS. 8A, 8E.)

The relationship among the movement direction of the observer H, the image viewing state and the movement direction of the barrier is shown in FIG. 9. As shown in FIG. 9, the 3D image display device 1 according to the embodiment moves the image transmitting portion S1 of the light-shielding barrier 2 by the ¼ of the light-shielding portion pitch Q when the sensor 100 detects that the position of the observer H is in the right-crosstalk state. The 3D image display device 1 also moves the image transmitting portion S1 of the shielding barrier 2 by ½ of the light-shielding portion pitch Q when the sensor 100 detects that the position of the observer H is in the reverse vision state. The 3D image display device 1 further moves the image transmitting portion S1 of the light-shielding barrier 2 by ¾ or −¼ of the light-shielding portion pitch Q when the sensor 100 detects that the position of the observer H is in the left-crosstalk state.

As described above, the 3D image display device 1 according to the embodiment moves the image transmitting portion S1 in the direction corresponding to the image viewing state of the observer H (refer to FIG. 9) when the sensor 100 detects that the position of the head of the observer H has moved, thereby allowing the observer H to view good 3D images. As described above, only the movement of the image transmitting portion S1 (namely, drive control of the light-shielding barrier 2) is performed even when the observer H is moved, therefore, it is not necessary to switch between the right-eye image R and the left-eye image L to be displayed on pixels of the liquid crystal panel 3. Accordingly, the 3D image display device 1 will be a highly reliable device in which good 3D images can be viewed without performing complicated control.

The case in which the light-shielding barrier 2 includes four pixels S in one light-shielding portion pitch Q has been explained as the above, however, it is also preferable that the light-shielding barrier 2 includes eight pixels S in one light-shielding portion pitch Q and that three pixels S of them form the image transmitting portions S1 through which images are transmitted. At this time, other five pixels S in one light-shielding portion pitch Q function as the image non-transmitting portions S2. The number of pixels S forming the image transmitting portions S1 is set to three as described above, thereby obtaining display images in which generation of moire is preferentially prevented.

It is further preferable that two pixels S in eight pixels S in one light-shielding portion pitch Q form the image transmitting portions S1. The number of pixels S forming the image transmitting portions S1 is set to two as described above, thereby obtaining display images in which generation of crosstalk is preferentially prevented.

Furthermore, the 3D image display device 1 can apply a configuration in which the number of pixels forming the image transmitting portions S1 of pixels S in one light-shielding portion pitch Q can be switched between two or three. When such configuration is applied, the highly functional display device can be obtained, which can respond to either the case in which the observer H gives priority to elimination of moire or the case in which the observer H gives priority to elimination of crosstalk.

In such case, when the head of the observer H moves by ¼ of the distance between eyes E, the image transmitting portion S1 is moved by ⅛ of the light-shielding portion pitch Q, thereby preventing the crosstalk region from being viewed by the observer H.

Figure 10:
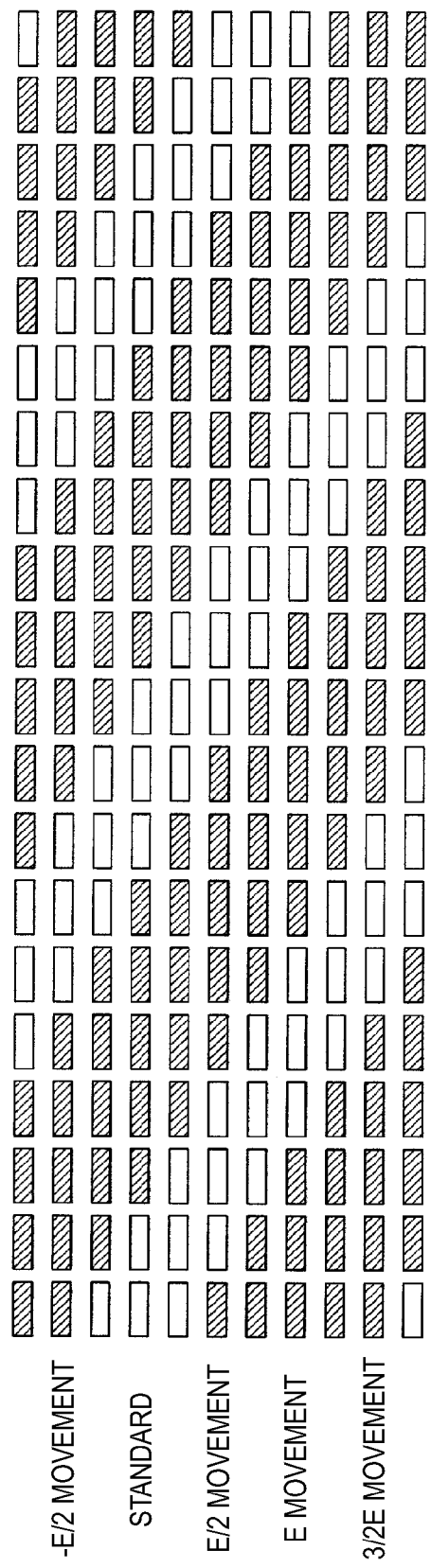
FIG. 10 is a view showing the relationship between the movement amount of the observer and the movement amount of the image transmitting portion according to a modification example.

FIG. 10 is a schematic view showing the positional relationship among the movement direction and distance of the observer H and the image transmitting units S1 of the light-shielding barrier 2. Specifically, positions of the image transmitting portions S1 obtained when the head position of the observer H moves ¼ by ¼ of the distance between eyes E. The uppermost row corresponds to a case in which the position has moved by −3E/4 and the lowermost row corresponds to a case in which the position has moved by 7E/4.

When the head of the observer H moves by E or more (for example, 5E/4) in the right direction, the reverse vision state is changed into the left-crosstalk state as described above. As shown in FIG. 10, in the case that the head of the observer H moves in the right direction by 5E/4, the image transmitting portion S1 can be set to the same position as in the case in which the image transmitting portion S1 is moved in the right direction from the standard state by 5Q/8 of the light-shielding portion pitch Q by moving the image transmitting portion S1 in the left direction from the standard state by −⅜. Similarly, when the head of the observer H moves in the right direction by 3E/2, the image transmitting portion S1 is preferably moved in the left direction from the standard state by −¼ of the light-shielding portion pitch Q. When the head of the observer H moves in the right direction by 7E/2, the image transmitting portion S1 is preferably moved in the left direction from the standard state by −⅛ of the light-shielding portion pitch Q.

Figures 11, 12:
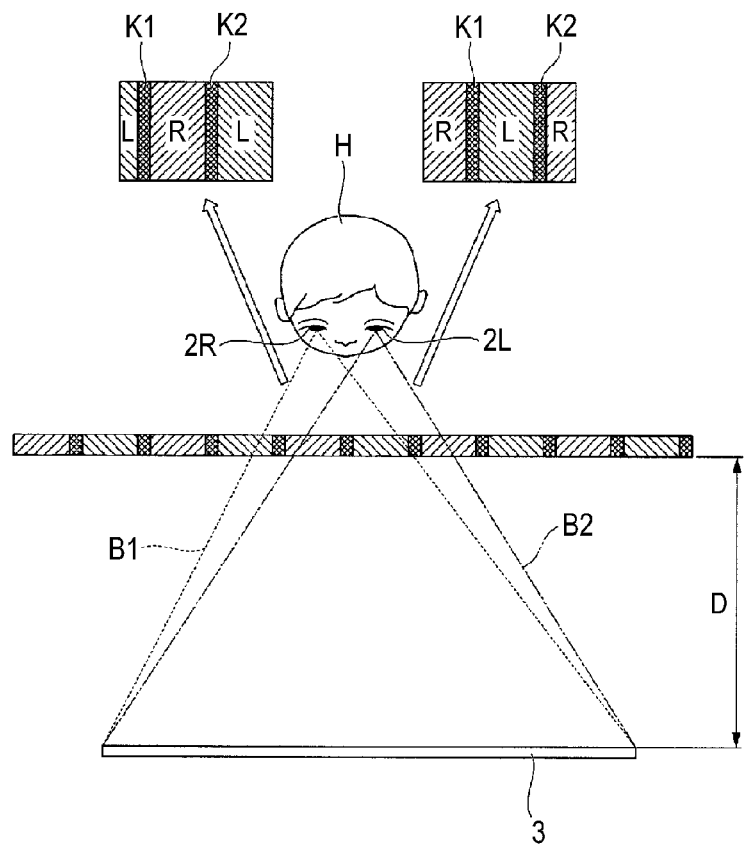
FIG. 11 is a chart showing the relationship among the movement direction of the observer, the image viewing state and the movement direction of the barrier according to the modification example.
FIG. 12 is a schematic view showing states of images seen by the right eye and the left eye of the observer positioned backward from the suitable viewing distance.

The relationship among the movement direction of the observer H, the image viewing state and movement direction of the barrier in the above case is shown in a table of FIG. 11. As shown in FIG. 11, the 3D image display device 1 according to the embodiment can move the position of the image transmitting portion S1 every time the position of the observer H detected by the sensor 100 moves by E/4. Therefore, it is possible to provide the high-performance display device capable of allowing the observer H to view 3D images so as to respond to smaller movement of the observer H as compared with the case in which one light-shielding portion pitch Q includes four pixels S.

Next, in the 3D image display device 1, a case in which the head of the observer H is deviated backward for more than a given distance from the suitable viewing range will be explained.

FIG. 12 is a schematic view showing states of images seen by the right eye and the left eye of the observer H positioned backward from the suitable viewing distance. As shown in FIG. 12, an image in a range B1 denoted by dashed lines is incident on the right eye of the observer H when positioned backward from the suitable viewing distance D. An image in a range B2 denoted by chain double-dashed lines is incident on the left eye of the observer H. Accordingly, the right-eye image R, the left-eye image L and crosstalk images K1, K2 are viewed in a mixed state by the right eye and the left eye respectively.

Here, the image incident on the right eye or the left eye of the observer H depends on the position of the head of the observer H. The 3D image display device 1 can determine the image viewed by the right eye through respective light-shielding regions A1 to A16 by detecting how far the head of the observer H is apart from the suitable viewing distance by the sensor 100.

Therefore, for example, in the case shown in FIG. 12, the image in which the left-eye image L, the left-crosstalk image K1, the right-eye image R, the right-crosstalk image K2 and the left-eye image L are mixed in the order from the left side is viewed by the right eye. Similarly, the image in which the right-eye image R, the left-crosstalk image K1, the left-eye image L, the right-crosstalk image K2 and the right-eye image R are mixed in the order from the left wide is viewed by the left eye.

The 3D image display device 1 according to the embodiment controls the movement amount of the light-shielding portion pitch Q in each set of light-shielding regions A1 to A16 shown in FIG. 4, thereby allowing the right-eye image R to be exactly incident on the right eye as a dominant eye of the observer H as well as allowing the left-eye image L to be almost exactly incident on the left eye to realize good 3D images. When the light-shielding portion pitch Q moves by using the right eye as a standard, the image incident on the left eye is also changed, therefore, the left-eye image L is incident on the left eye when only the right-eye image R is incident on the right eye.

Hereinafter, a control method of the light-shielding barrier when the observer is positioned backward from the suitable viewing distance by a certain distance will be explained. FIG. 13 is a view showing correspondence between the image seen by the right eye of the observer and the light-shielding regions A1 to A16 of the light-shielding barrier 2 in the explanation.

The center of the image (image center) incident on the right eye is represented by a dashed line C1 in the drawing. The center of the crosstalk (crosstalk center) in the image incident on the right eye is represented by a dashed line C2 in the drawing. Here, the image center means a region where the right-eye image R is seen most normally and the crosstalk center means the central portion of the region where the crosstalk image K is seen, namely, where the crosstalk is seen most clearly.

As shown in FIG. 13, the image center of the right eye corresponds to between light-shielding regions A7, A8. The center of left-crosstalk image K1 of the right eye corresponds to between light-shielding regions A1, A2. The center of the right-crosstalk image K2 of the right eye corresponds to between light-shielding regions A13, A14. The 3D image display device 1 individually determines the movement amount of the image transmitting portion S1 in respective light-shielding regions A1 to A16 from the positional relationship among the sixteen light-shielding regions, the image center and the crosstalk center.

Specifically, the 3D image display device 1 moves the position of the image transmitting portion S1 by ¼ of the light-shielding portion pitch Q from the standard state in the light-shielding regions A1, A2 corresponding to the region where the right-crosstalk image K1.

The 3D image display device 1 also moves the position of the image transmitting portion S1 by ¼ of the light-shielding portion pitch Q from the standard state in the minus direction in the light-shielding regions A13, A14 corresponding to the region where the left-crosstalk image K2.

Normally, a boundary between the normal vision image (right-eye image R) and the crosstalk image K or a boundary between the reverse vision image (left-eye image L) and the crosstalk image K is not clear. In response to this, the image transmitting portion S1 is moved so as to correspond to the crosstalk images K1, K2 at the boundaries between the normal vision image or the reverse vision image and the crosstalk images K1, K2 in the embodiment.

In the embodiment, the position of the image transmitting portion S1 is moved by ¼ of the light-shielding portion pitch Q from the standard state in the light-shielding regions A1 to A3, the position of the image transmitting portion S1 is moved in the minus direction by ¼ of the light-shielding portion pitch Q from the standard state in the light-shielding regions A12 to A15, and the position of the image transmitting portion S1 is moved by ½ of the light-shielding portion pitch Q from the standard state in the light-shielding region A16. The 3D image display device 1 moves the position of the image transmitting portion S1 by ½ of the light-shielding portion pitch Q from the standard state in the light-shielding region A16 corresponding to the reserve vision image. The position of the image transmitting portion S1 is not moved in the light-shielding regions A4 to A11 corresponding to the normal vision image (right-eye image R).

As described above, the right-eye image R can be exactly incident on the right eye even when the observer H is at a position shifted backward from the suitable viewing distance D. Accordingly, the left-eye image L can be also incident on the left eye. Therefore, the observer H can view good 3D images even when the observer H is at the position shifted backward from the suitable viewing distance D.

The case in which the dominant eye of the observer H is the right eye has been explained as the above. When the dominant eye is the left eye, the light-shielding pitch Q in respective light-shielding regions is adjusted by using the left eye as a standard, thereby allowing the observer H to view good 3D images. Additionally, when the observer H is at a position shifted forward from the suitable viewing distance D, the movement amount of the image transmitting portion S1 is set in each set of the light-shielding regions A1 to A16 in the same manner in the embodiment, thereby allowing the right-eye image R to be exactly incident on the right eye as well as allowing the left-eye image L to be incident on the left eye.

The case in which the pixels S of the light-shielding barrier 2 forming the image transmitting portions S1 have a stripe shape has been explained as the above, however, the application is not limited to this, and for example, the pixels S may have a checkerboard shape or an oblique stripe shape in accordance with arrangement of pixels 3a of the liquid crystal panel 3.

Also the case in which the light-shielding barrier 2 is arranged on the image projection side of the liquid crystal panel 3 has been explained as the above, however, the application is not limited to this, and the light-shielding barrier 2 may be arranged on the opposite side of the liquid crystal panel 3.

(Electronic Apparatus)

Figure 14:
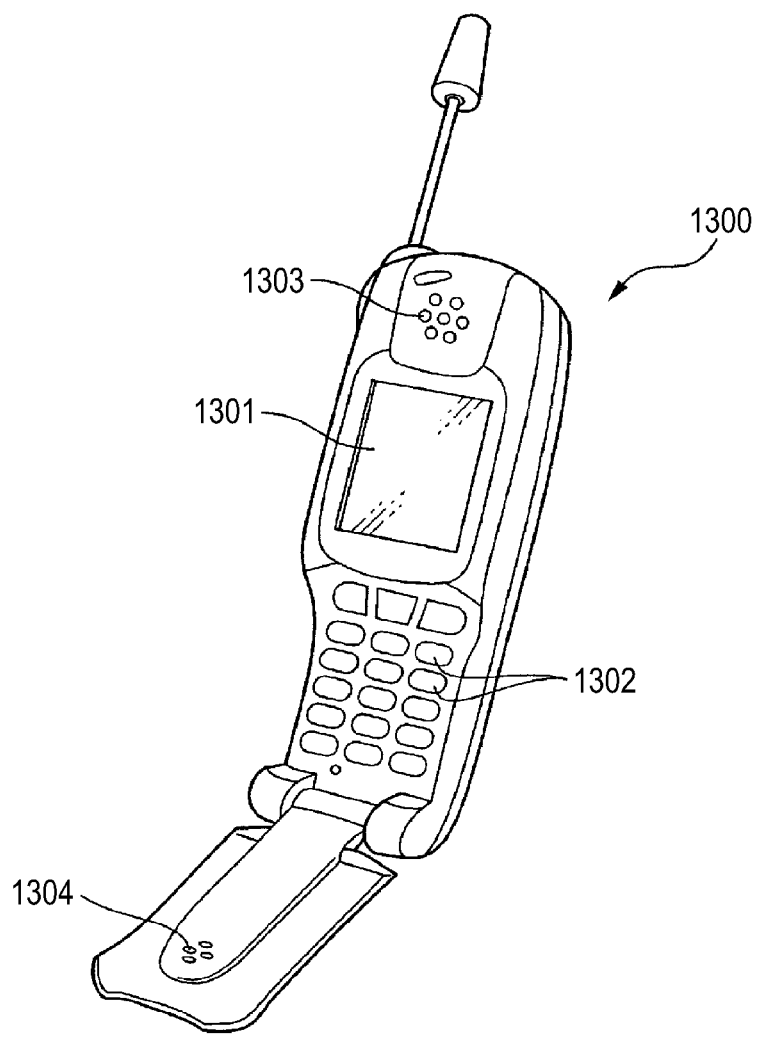
FIG. 14 is a view showing a structure of a cellular phone according to an embodiment of an electronic apparatus.

FIG. 14 is a perspective view showing an example of electronic apparatus according to the embodiment. A cellular phone 1300 in the drawing includes the display device according to the embodiment as a small-sized display unit 1301, plural operation buttons 1302, an ear piece 1303 and a mouth piece 1304. The display device according to the embodiment can be suitably used not only the cellular phone but also as an image display means of an electronic book, a personal computer, a digital still camera, a liquid crystal television, a viewfinder type or a monitor-direct view type video tape recorder, a car navigation device, a pager, an electronic databook, an electric calculator, a word processor, a work station, a video phone, a POS terminal, apparatus having a touch panel and so on, which can provide highly-reliable electronic apparatus capable of displaying good 3D images in any electronic apparatus.

The preferred embodiment has been explained with reference to the drawing as described above, however, it goes without saying that the application is not limited to the above embodiment. Various shapes or combinations and so on of respective components shown in the above embodiment are just examples and may be variously modified based on design demand and the like within a scope not departing from the gist of the application.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display device comprising:
    an image display device for displaying left-eye images and right-eye images alternately;
    a light-shielding barrier for generating an effect of binocular parallax in images displayed by the image display device, the light-shielding barrier being formed by a liquid crystal panel; and
    a detection device for detecting a head position of an observer to obtain head position information including:
    a to-display distance from a head of the observer perpendicular to a surface of the image display device; and
    a shift distance that the head position moves parallel to the surface of the image display device,
    wherein the light-shielding barrier having a plurality of barrier portions each includes:
    an image transmitting portion through which images of the image display device are transmitted; and
    an image non-transmitting portion through which images are not transmitted,
    wherein, when the shift distance is E: a distance between the eyes of the observer, 1/2E, or 4/1E, the light-shielding barrier moves a position of the image transmitting portion by ½, ¼, or ⅛ of a light-shielding portion pitch, respectively, the light-shielding portion pitch being defined by an arrangement interval of the image transmitting portion,
    wherein one pitch of the light-shielding portion pitch includes four pixels in the liquid crystal panel and one of the four pixels forms the image transmitting portion,
    wherein, when the observer is positioned at a suitable viewing position, only right-eye images of the image display are incident on a right eye after transmitting through a center of each image transmitting portions of the light-shielding barrier, and only left-eye images of the image display are incident on the left eye after transmitting through a center of each transmitting portions of the light-shielding barrier,
    wherein a suitable viewing distance is the to-display distance at the suitable viewing position,
    wherein a backward image is an image that is observed by one of the eyes of the observer when the to-display distance is greater than the suitable viewing distance and that includes a crosstalk image,
    wherein the backward image includes:
    a right crosstalk image having a right crosstalk central in a center of the right crosstalk image in the horizontal direction;
    a normal image having a normal central in a center of the normal image in a horizontal direction; and
    a left crosstalk image having a left crosstalk central in a center of the left crosstalk image in a horizontal direction, and
    wherein the light-shielding barrier controls a movement amount of the image transmitting portion individually in each of the barrier portions according to positional relations of the left crosstalk central, the normal central, the right crosstalk central, and each of the barrier portions to allow the transmitting portion, which is changed to be observed as the crosstalk image due to a change of the to-display distance, to become the image non-transmitting portion.

2. The display device according to claim 1, wherein the light-shielding barrier is configured to switch the number of pixels forming the image transmitting portions.

3. An electronic apparatus comprising the display device according to claim 1.

4. The display device according to claim 1, wherein the head position information further includes a position of one of right and left eyes of the observer, and
    wherein the light-shielding barrier moves a position of the image non-transmitting portion based on the position of the one of the right and left eyes of the observer.

5. A display device comprising:
    an image display device for displaying left-eye images and right-eye images alternately;
    a light-shielding barrier for generating an effect of binocular parallax in images displayed by the image display device, the light-shielding barrier being formed by a liquid crystal panel; and
    a detection device for detecting a head position of an observer to obtain head position information including:
    a to-display distance from a head of the observer perpendicular to a surface of the image display device; and
    a shift distance that the head position moves parallel to the surface of the image display device,
    wherein the light-shielding barrier having a plurality of barrier portions each includes:
    an image transmitting portion through which images of the image display device are transmitted; and an image non-transmitting portion through which images are not transmitted, wherein, when the shift distance is E: a distance between the eyes of the observer, 1/2E, or 4/1E, the light-shielding barrier moves a position of the image transmitting portion by ½, ¼, or ⅛ of a light-shielding portion pitch, respectively, the light-shielding portion pitch being defined by an arrangement interval of the image transmitting portion, wherein one pitch of the light-shielding portion pitch includes eight pixels in the liquid crystal panel and adjacent two or three of the eight pixels form the image transmitting portions, wherein, when the observer is positioned at a suitable viewing position, only right-eye images of the image display are incident on a right eye after transmitting through a center of each image transmitting portions of the light-shielding barrier, and only left-eye images of the image display are incident on the left eye after transmitting through a center of each transmitting portions of the light-shielding barrier, wherein a suitable viewing distance is the to-display distance at the suitable viewing position, wherein a backward image is an image that is observed by one of the eyes of the observer when the to-display distance is greater than the suitable viewing distance and that includes a crosstalk image, wherein the backward image includes:

a right crosstalk image having a right crosstalk central in a center of the right crosstalk image in the horizontal direction;

a normal image having a normal central in a center of the normal image in a horizontal direction; and a left crosstalk image having a left crosstalk central in a center of the left crosstalk image in a horizontal direction, and wherein the light-shielding barrier controls a movement amount of the image transmitting portion individually in each of the barrier portions according to positional relations of the left crosstalk central, the normal central, the right crosstalk central, and each of the barrier portions to allow the transmitting portion, which is changed to be observed as the crosstalk image due to a change of the to-display distance, to become the image non-transmitting portion.

6. The display device according to claim 5, wherein the light-shielding barrier is configured to switch the number of pixels forming the image transmitting portions.

7. An electronic apparatus comprising the display device according to claim 5.

8. The display device according to claim 5, wherein the head position information further includes a position of one of right and left eyes of the observer, and wherein the light-shielding barrier moves a position of the image non-transmitting portion based on the position of the one of the right and left eyes of the observer.

* * * * *